United States Patent
Arbjerg et al.

(10) Patent No.: US 10,953,915 B2
(45) Date of Patent: Mar. 23, 2021

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 271 days.

(21) Appl. No.: 15/970,327

(22) Filed: May 3, 2018

(65) Prior Publication Data
US 2018/0319433 A1 Nov. 8, 2018

(30) Foreign Application Priority Data
May 8, 2017 (DE) ...................... 10 2017 109 801.1

(51) Int. Cl.
| B62D 5/065 | (2006.01) |
| B62D 5/12 | (2006.01) |
| B62D 5/093 | (2006.01) |

(52) U.S. Cl.
CPC ............... *B62D 5/12* (2013.01); *B62D 5/093* (2013.01)

(58) Field of Classification Search
CPC .................................. B62D 5/12; B62D 5/093
See application file for complete search history.

(56) References Cited

U.S. PATENT DOCUMENTS

| 4,412,415 A | 11/1983 | Thomsen |
| 4,676,334 A * | 6/1987 | Nakamura ............... B62D 6/00 |
| | | 180/422 |

(Continued)

FOREIGN PATENT DOCUMENTS

| CN | 104066641 A | 9/2014 |
| CN | 104097686 A | 10/2014 |

(Continued)

OTHER PUBLICATIONS

International Search Report for Serial No. PCT/EP2018/060041 dated Jul. 10, 2018.

*Primary Examiner* — Tony H Winner
(74) *Attorney, Agent, or Firm* — McCormick, Paulding & Huber PLLC

(57) ABSTRACT

A hydraulic steering unit (1) is described comprising a supply port arrangement having a pressure port (P) connected to a main flow path (6) and a tank port (T) connected to a tank flow path (7), a working port arrangement having a left working port connected to a left working flow path (8) and a right working port (R) connected to a right working flow path (9), a bridge arrangement (14) of variable orifices (A2L, A2R, A3L, A3R) having a first left orifice (A2L) connected to the main flow path (6) and to the left working flow path (8), a first right orifice (A2R) connected to the main flow path (6) and to the right working flow path (9), a second left orifice (A3L) connected to the left working flow path (8) and to the tank flow path (7), and a second right orifice (A3R) connected to the right working flow path (9) and to the tank flow path (7). Such a steering unit should make steering comfortable. To this end a measuring motor (15) a measuring motor (15) is arranged in one of the left working flow path (8) and the right working flow path (9) and an amplification flow path (16) is connected to the one (Continued)

working flow path (8, 9) downstream the measuring motor (15).

20 Claims, 4 Drawing Sheets

(56) References Cited

U.S. PATENT DOCUMENTS

| | | | | |
|---|---|---|---|---|
| 4,862,985 A * | 9/1989 | Uchida | ................... | B62D 6/00 180/423 |
| 4,958,493 A | 9/1990 | Schutten et al. | | |
| 5,515,938 A | 5/1996 | Haga et al. | | |
| 5,819,532 A * | 10/1998 | Wang | ...................... | B62D 5/09 60/384 |
| 6,035,760 A * | 3/2000 | Suzuki | ................... | B62D 5/083 91/375 R |
| 7,497,183 B2 * | 3/2009 | Dudra | ................... | B63H 25/30 114/150 |
| 9,424,668 B1 * | 8/2016 | Petrou | ................... | G06T 11/206 |
| 9,550,521 B2 * | 1/2017 | Andersen | ............... | B62D 5/093 |
| 10,161,425 B2 * | 12/2018 | Liljenberg | ............. | F15B 11/08 |
| 10,611,402 B2 * | 4/2020 | Arbjerg | ................. | B62D 5/065 |
| 2014/0374187 A1 * | 12/2014 | Arbjerg | ................... | B62D 5/30 180/441 |
| 2016/0332661 A1 * | 11/2016 | Porskrog | ............... | B62D 5/062 |
| 2018/0319431 A1 * | 11/2018 | Arbjerg | ................. | B62D 5/093 |
| 2018/0319432 A1 * | 11/2018 | Arbjerg | ................. | B62D 5/093 |

FOREIGN PATENT DOCUMENTS

| | | |
|---|---|---|
| DE | 102005011526 A1 | 10/2006 |
| EP | 2 610 138 A1 | 7/2013 |
| EP | 3093212 A1 | 11/2016 |

* cited by examiner

HYDRAULIC STEERING UNIT

CROSS-REFERENCE TO RELATED APPLICATION

This application claims foreign priority benefits under U.S.C. § 119 to German Patent Application No. 10 2017 109 801.1 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connecting to the main flow path and to the right working flow path, a second left orifice connected to the left working flow path and to the tank flow path, and a second right orifice connected to the right flow path and to the tank flow path.

BACKGROUND

Such a steering unit is known, for example, from U.S. Pat. No. 4,676,334. In such a kind of hydraulic steering unit the variable orifices are arranged in a kind of Wheatstone bridge. One diagonal of the bridge is arranged between the pressure port and the tank port and the other diagonal is arranged between the two working ports.

When, for example, it is intended to steer a vehicle equipped with such a steering unit to the left, the first left orifice and the second right orifice are opened, wherein the second left orifice and the first right orifice are closed or remain closed. Hydraulic fluid from the pressure port then flows through the first left orifice to the left working port and from there to a steering motor connected to the working port arrangement. Hydraulic fluid displaced from the steering motor flows back through the right working port and the right working flow path to the second right orifice. When passing the second right orifice the fluid is returned to the tank flow path and from there to the tank port.

The orifices are usually formed by a spool-sleeve-arrangement. A steering wheel is connected to one of the spool and the sleeve. When the steering wheel is turned, spool and sleeve are rotated relatively to each other to open two orifices and to close two other orifices. The hydraulic fluid flowing from the pressure port to the working port arrangement drives a measuring motor which in turn restores the spool-sleeve-set to its original or neutral position. In this way, it is possible to supply the required amount of hydraulic fluid to the working port arrangement and from there to the steering motor.

SUMMARY

The object underlying the present invention is to make steering comfortable.

This object is solved with a hydraulic steering unit as described at the outset in that a measuring motor is arranged in one of the left working flow path and the right working flow path and an amplification flow path is connected to the one working flow path downstream the measuring motor.

In such a steering unit not all hydraulic fluid flowing to the working port arrangement has to pass the measuring motor. Only part of the fluid flows through the measuring motor and drives the measuring motor. The other part of the hydraulic fluid passes the amplification flow path. When the measuring motor is arranged in one of the working flow paths the steering unit has no or at least a very small dead band which makes steering very comfortable. In addition the amount of hydraulic fluid flowing to the working port arrangement is amplified by the amplification flow path so that the driver of a vehicle equipped with such a steering unit needs less turns of the steering wheel for achieving the same steering angle with the steering motor.

In an embodiment of the invention the amplification flow path is connected to a main flow path and comprises a first branch having a left amplification orifice connected to the left working flow path and a second branch having a right amplification orifice connected to the right working flow path. The amplification orifices can be formed by the same spool-sleeve-set forming the first and second left and right orifices.

In an embodiment of the invention a controlled auxiliary flow path is connected between the working flow path downstream the measuring motor and the tank flow path. The auxiliary flow path corresponds to the amplification flow path, however, for the other steering direction.

In an embodiment an auxiliary orifice is arranged in the auxiliary flow path. The auxiliary orifice can be formed by a same spool-sleeve-set, as mentioned above.

In an embodiment of the invention the auxiliary orifice is closed in neutral position. In neutral position there is no possibility for the hydraulic fluid to escape from the steering motor and the working port arrangement to any other ports of the steering unit via the auxiliary orifice.

In an embodiment of the invention a check valve is arranged in the amplification flow path which check valve opens in a direction to the working port arrangement. Such a check valve can be used in emergency situations when the measuring motor is used as auxiliary pump.

In an embodiment of the invention the amplification flow path is arranged parallel to the measuring motor. This is a rather simple construction having an amplification effect. The measuring motor and the amplification flow path can be passed in both directions. One direction is used when hydraulic fluid flows from the pressure port to the working port arrangement and the other direction is used when the hydraulic fluid flows from the working port arrangement to the tank port.

In an embodiment of the invention the working flow path and the amplification flow path comprise an orifice arrangement determining a relation between the flow through the measuring motor and the flow through the amplification flow path. In other words, there is a variable orifice in the working flow path containing the measuring motor and another variable orifice is arranged in the amplification flow path. The variable orifice in the amplification flow path is preferably a closed neutral orifice whereas the orifice in the working flow path can be a neutral open orifice. The relation between the flow resistances of the two orifices determines the relation of the amount of hydraulic fluid flowing through the amplification path and the amount of fluid flowing through the measuring motor.

In an embodiment of the invention a torque compensator is arranged in the amplification flow path. The torque compensator compensates, for example, for gear-set friction of the measuring motor. Furthermore, it improves bypass flow through the amplification flow path.

In an embodiment of the invention the torque compensator is actuated by a pressure difference over the measuring motor. When there is a pressure difference exceeding a predetermined threshold level, the torque compensator closes the amplification flow path.

BRIEF DESCRIPTION OF THE DRAWINGS

Embodiments of the invention will now be described in more detail with reference to the drawing, wherein.

DETAILED DESCRIPTION

Figure 1:
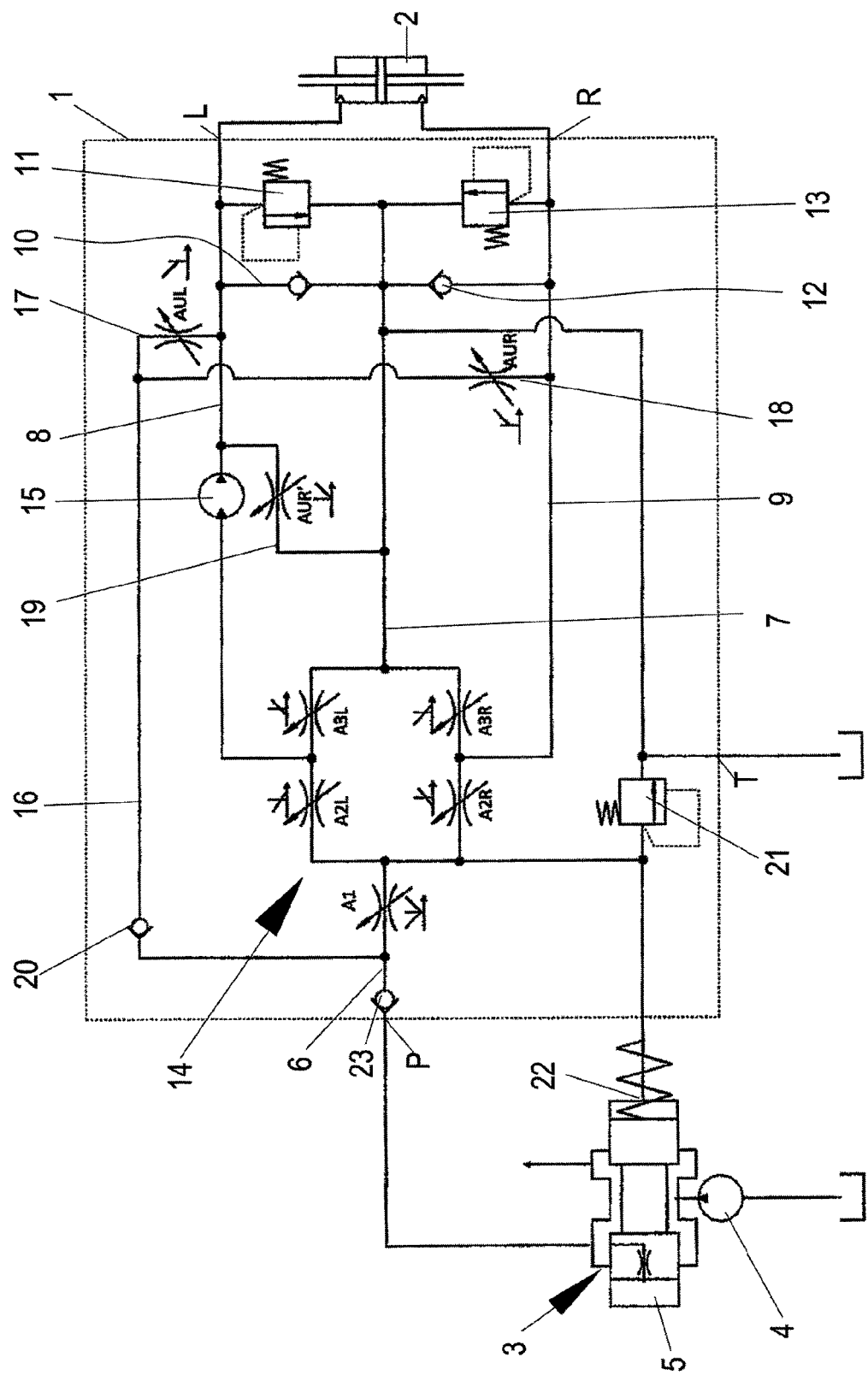
FIG. 1 shows a first embodiment of the invention.

FIG. 1 shows a first embodiment of a hydraulic steering unit 1. The hydraulic steering unit 1 comprises a supply port arrangement having a pressure port P and a tank port T. Furthermore, the hydraulic steering unit 1 comprises a working port arrangement having a left working port L and a right working port R. A steering motor 2 is connected to the working port arrangement L, R.

The pressure port P is connected to a pressure source 3 which can basically be of any form. In the present case, the pressure source 3 comprises a pump 4 and a priority valve 5.

The pressure port P is connected to a main flow path 6. The tank port T is connected to a tank flow path 7. The left working port L is connected to a left working flow path 8 and the right working port R is connected to a right working flow path 9.

The left working flow path 8 is connected to the tank flow path 7 by means of a check valve 10 opening in a direction from a tank flow path 7 to the left working flow path 8. The left working flow path 8 is furthermore connected to the tank flow path 7 by means of a pressure relief valve 11. In a similar way the right working flow path 9 is connected to the tank flow path 7 via a check valve 12 opening from the tank flow path 7 to the right working flow path 9. The right working flow path 9 is connected to the tank flow path 7 via a pressure relief valve 13.

The hydraulic steering unit 1 comprises a bridge arrangement 14 of variable orifices, which are a first left orifice A2L, a second left orifice A3L, a first right orifice A2R and a second right orifice A3R. The first left orifice A2L is connected to the main flow path 6 and to the left working flow path 8. The second left orifice A3L is connected to the left working flow path 8 and to the tank flow path 7. The first right orifice A2R is connected to the main flow path 6 and to the right working flow path 9. The second right orifice A3R is connected to the right working flow path 9 and to the tank flow path 7.

In other words: one diagonal of the bridge arrangement 14 is arranged between the pressure port P and the tank port T and the other diagonal of the bridge arrangement 14 is arranged between the two working ports L, R.

A measuring motor 15 is arranged in the left working flow path 8. Alternatively, it could also be arranged in the right working flow path 9.

An amplification flow path 16 connects the main flow path 6 and the left working flow path 8 downstream the measuring motor 15. The term "downstream" here means that the amplification flow path 16 is connected to a point between the measuring motor 15 and the left working flow path L.

The amplification flow path 16 comprises a first branch 17 opening into the left working flow path 8. A left amplification orifice AUL is arranged in the first branch 17. Furthermore, the amplification flow path 16 comprises a second branch 18 having a right amplification orifice AUR. The second branch 18 is connected to the right working flow path 9.

The left amplification orifice AUL and the right amplification orifice AUR are neutral open orifices, i.e. they are not fully closed in the neutral position but allow a small flow of hydraulic fluid.

An auxiliary flow path 19 is connected between the left working flow path 8 downstream the measuring motor 15 and the tank flow path 7. The term "downstream" has the same meaning as explained above. When the measuring motor 15 is arranged in the right working flow path 9 the auxiliary flow path 19 would be connecting the right working flow path 9 and the tank flow path 7.

The auxiliary flow path 19 is controlled meaning that an auxiliary orifice AUR' is arranged in the auxiliary flow path 19. The auxiliary orifice AUR' is a neutral closed orifice. The opening behavior of all orifices is shown by small symbols next to the respective orifices.

A check valve 20 is arranged in the amplification flow path 16 opening in a direction from the main flow path 6 towards the two branches 17, 18 of the amplification flow path 16. The check valve 20 is used in an emergency steering situation when the measuring motor 15 is used as auxiliary pump.

A main orifice A1 is arranged in the main flow path 6 and more precisely between the bridge arrangement 14 and the amplification flow path 16. The main orifice A1, when in form of a neutral open orifice, can allow a small permanent flow of hydraulic fluid through the bridge arrangement 14. However, this flow is minimized in the neutral position. An outcome of having a lower supply flow entering the bridge arrangement 14 is that the general pressure level inside the bridge arrangement 14 will be lowered and therefore the outer forces acting on steering motor 2 will have a greater impact on the steering system, in particular the gear set of the measuring motor 15, thereby improving the self-realignment capabilities.

In another embodiment (not shown) the main orifice A1 can be a neutral closed orifice, i.e. it is closed in the neutral position, so that no hydraulic fluid can reach the bridge arrangement 14. In this way, a closed neutral can be achieved.

In addition, a tank orifice (not shown) can be arranged in the tank flow path 7. When this tank orifice is a fixed orifice it can be used for creating a back pressure that is independent on the opening degree of the first and second orifices in their respective flow paths 8, 9. When a spool-sleeve-set is used, the back pressure is independent of the spool-sleeve-angle for improved stability.

It is, however, also possible to use a variable tank orifice to decrease the resistance across the variable second orifices A3L, A3R and to improve the emergency steering.

A further modification of the steering unit shown in FIG. 1 would be the use of a variable third left orifice arranged in the left working flow path 8 and a variable third right orifice arranged in the right working flow path 9. This allows for the possibility to make a closed-neutral set of orifices in an open-center system. In particular, when a spool-sleeve-set is used, it is possible to make a closed-neutral spool-sleeve-set.

The variable third left orifice and the variable third right orifice open preferably faster than the variable first left orifice A2L and the variable first right orifice A2R. The variable third orifices are in principle used to cut off the working flow paths 8, 9 and to trap hydraulic fluid in the working flow paths 8, 9 and in the respective pressure chambers of the steering motor 2.

The main orifice A1, the tank orifice and the variable third orifices can be used in basically all combinations. The main orifice A1 can be used alone. The tank orifice can be used alone. The variable third orifices can be used alone. It is, however, possible to use the main orifice A1 together with a tank orifice A10 and/or together with the variable third orifices. Furthermore, it is possible to use the tank orifice together with the variable third orifices.

As mentioned above, all orifices can be formed by a spool-sleeve-set. The spool is rotatably arranged within the sleeve and the sleeve is rotatably arranged within a housing. One of the spool and the sleeve is connected to a steering wheel or another steering command means. When the steering wheel is turned, spool and sleeve are rotated relatively to each other to open two orifices and to close the remaining other orifices of the bridge arrangement 14. When, for example, it is intended to steer the vehicle equipped with the steering unit 1 to the left, the first left orifice A2L and the second right orifice A3R are opened and the second left orifice A3L and the first right orifice A2R are closed. Furthermore, the left amplification orifice AUL is opened and the right amplification orifice AUR remains closed. Hydraulic fluid passing the first left orifice A2L flows through the measuring motor 15 to the left working port L. The measuring motor 15 is operatively connected to the spool-sleeve-set and restores spool and sleeve back to their original or neutral position once a required amount of hydraulic fluid has been supplied to one of the working ports L, R.

The left amplification orifice AUL opens concurrently with the first left orifice A2L of the bridge arrangement 14. An amount of hydraulic fluid then passes the amplification flow path 16 without flowing through the measuring motor 15. The relation between the amount flowing through the measuring motor 15 and flowing through the amplification flow path 16 is determined by the relation between the first left orifice A2L and the left amplification orifice AUL.

When the vehicle is steered to the right, basically the same relations are used. The first right orifice A2R and the second left orifice A3L open whereas the first left orifice A2L and the second right orifice A3R close. Furthermore, the right amplification orifice AUR opens and the left amplification orifice AUL closes. A first part of hydraulic fluid flows from the pressure port P through the first right orifice A2R to the right working port R. Another part of the hydraulic fluid flows through the amplification flow path 16 and the second branch 18 to a right working port R.

Hydraulic fluid displaced by the measuring motor 2 enters the steering unit 1 at the left working flow path L. Part of the hydraulic fluid flows through the measuring motor 15 and the second left orifice A3L back to the tank flow path 7 and from there to the tank port T. Another part of the hydraulic fluid displaced by the steering motor 2 flows through the auxiliary flow path 19 and the auxiliary orifice AUR' to the tank port 7 without passing the measuring motor 15 and from the tank flow path 7 back to the tank port T.

A further check valve 23 is arranged in the main flow path 6 opening in a direction away from the pressure port P.

Figure 2:
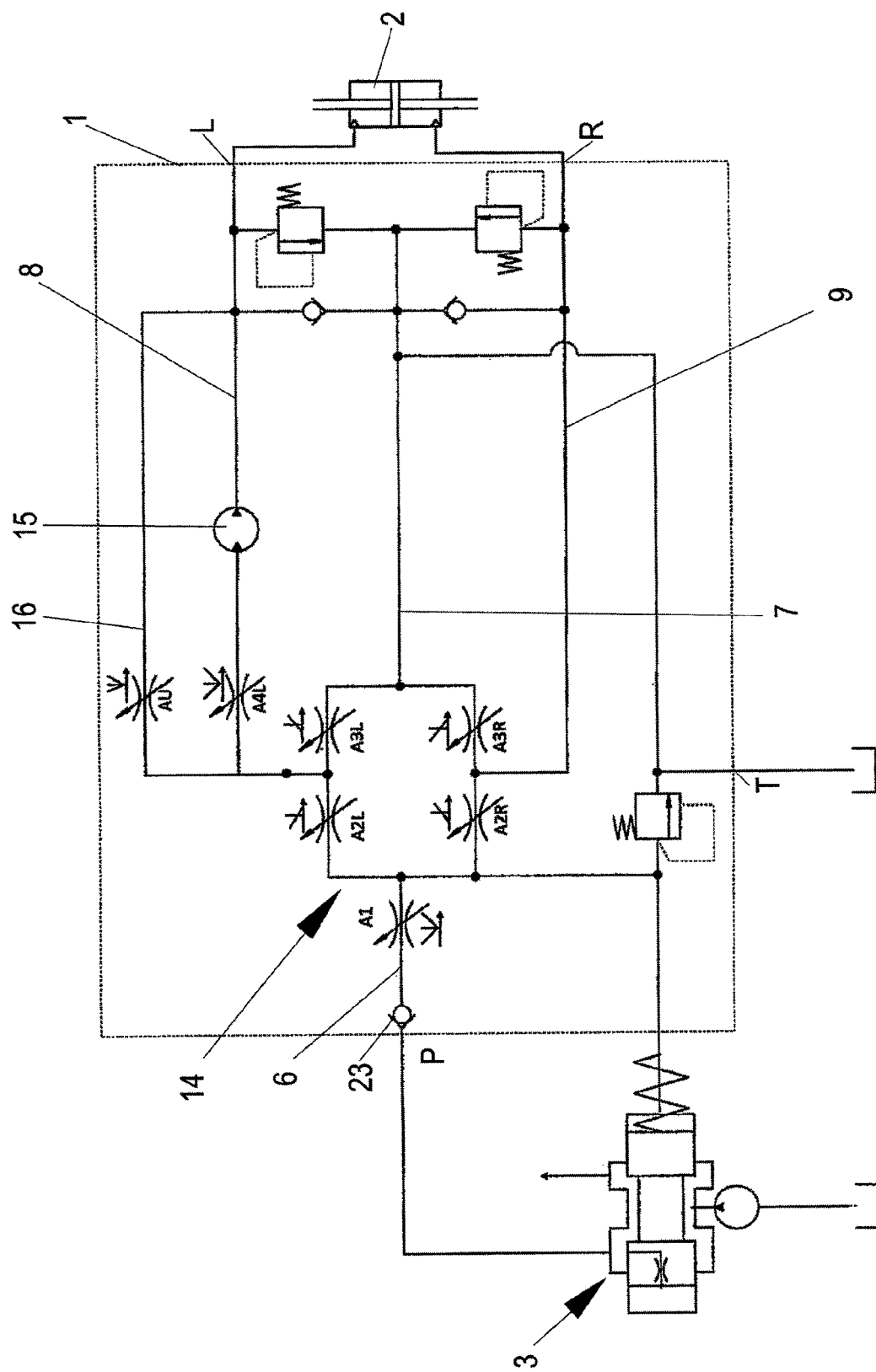
FIG. 2 shows a second embodiment of the invention.

FIG. 2 shows a slightly modified form of the steering unit 1. The bridge arrangement 14 and the remaining parts are the same. In this case as well the main orifice A1 can be used as described above. Furthermore, a tank orifice and a variable third orifice can be used in the left working flow path 8 and the right working flow path 9, respectively.

In the embodiment shown in FIG. 2 the amplification flow path 16 is arranged in parallel to the measuring motor 15. Depending on the direction of steering the measuring motor 15 and the amplification flow path 16 can be passed in one or in the opposite direction.

The left working flow path 8 (or the right working flow path 9, when the measuring motor 15 is arranged in the right working flow path 9) and the amplification flow path 16 comprise an orifice arrangement having a measuring motor orifice A4L in the left working path 8 and an amplification orifice AUL the amplification flow path 16. The orifice arrangement A4L, AU determine a relation between the flow through the measuring motor 15 and the flow through the amplification flow path 16.

When it is intended to steer the vehicle equipped with the steering unit 1 to the left, the first left orifice A2L and the second right orifice A3R are opened, while the other two orifices of the bridge arrangement 14 are closed. At the same time, the measuring motor orifice A4L and the amplification orifice AU are opened as well. Hydraulic fluid from the pressure port P passes the first left orifice A2L. Part of this flow flows through measuring motor 15 and the other part flows through the amplification flow path 16. The relation between these two parts is determined by the relation of the orifices A4L and AU of the orifice arrangement. The combined flow reaches the left working port L and from there the steering motor 2. Hydraulic fluid displaced from the steering motor 2 enters the steering unit 1 at the right working port R and flows via the right working flow path 9 and the second right orifice A3R to the tank flow path 7 and from there to the tank port T.

When the vehicle is steered to the right, the first right orifice A2R and the second left orifice A3L are opened while the other two orifices A2L, A3R of the bridge arrangement 14 are closed. Hydraulic fluid from the pressure port P reaches the right working port R via the main flow path 6, the main orifice A1, the first right orifice A2R and the right working flow path 9. Hydraulic fluid displaced from the steering motor 2 flows partly through the measuring motor 15 and partly through the amplification flow path 16 to the bridge arrangement 14 and through the second left orifice A3L to the tank flow path 7 and from there to the tank port T.

Figure 3:
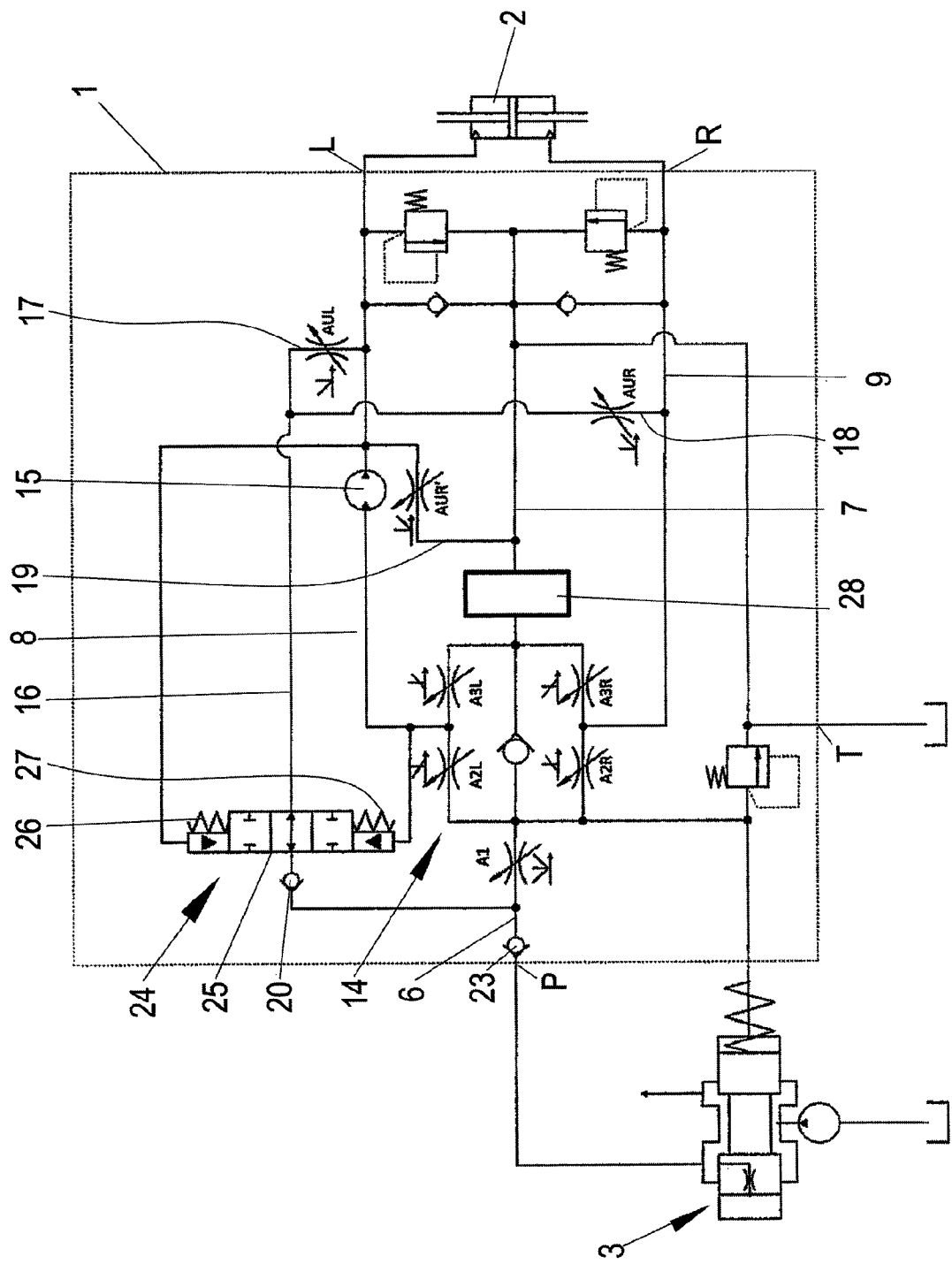
FIG. 3 shows a third embodiment of the invention.

FIG. 3 shows a further modified steering unit 1. The steering unit 1 of FIG. 3 corresponds basically to the steering unit 1 of FIG. 1.

However, a torque compensator 24 is arranged in the amplification flow path 16. The torque compensator 24 is in form of a valve having a valve element 25. When in neutral position, the valve element 25 allows a passage of hydraulic fluid through the amplification flow path 16. When the valve element 25 is out of neutral, this passage is interrupted so that no fluid can pass the amplification flow path 16.

The valve element 25 is loaded by a pressure difference over the measuring motor 15. Furthermore, the valve element 25 is loaded by two springs 26, 27 acting in opposite directions. However, each spring 26, 27 can shift the valve element 25 only to the neutral position. When the force generated by the pressure difference over the measuring motor 15 exceeds the force of one of the springs 26, 27, the valve element 25 is moved out of neutral to interrupt the amplification flow path 16. The torque compensator 24 improves bypass flow and compensates for gear-set friction of the measuring motor 15.

Furthermore, an emergency valve 28 is arranged in the tank flow path 7 between the bridge arrangement 14 and the auxiliary flow path 19. The emergency valve 28 is used in emergency situation when the measuring motor 15 functions as auxiliary pump.

Figure 4:
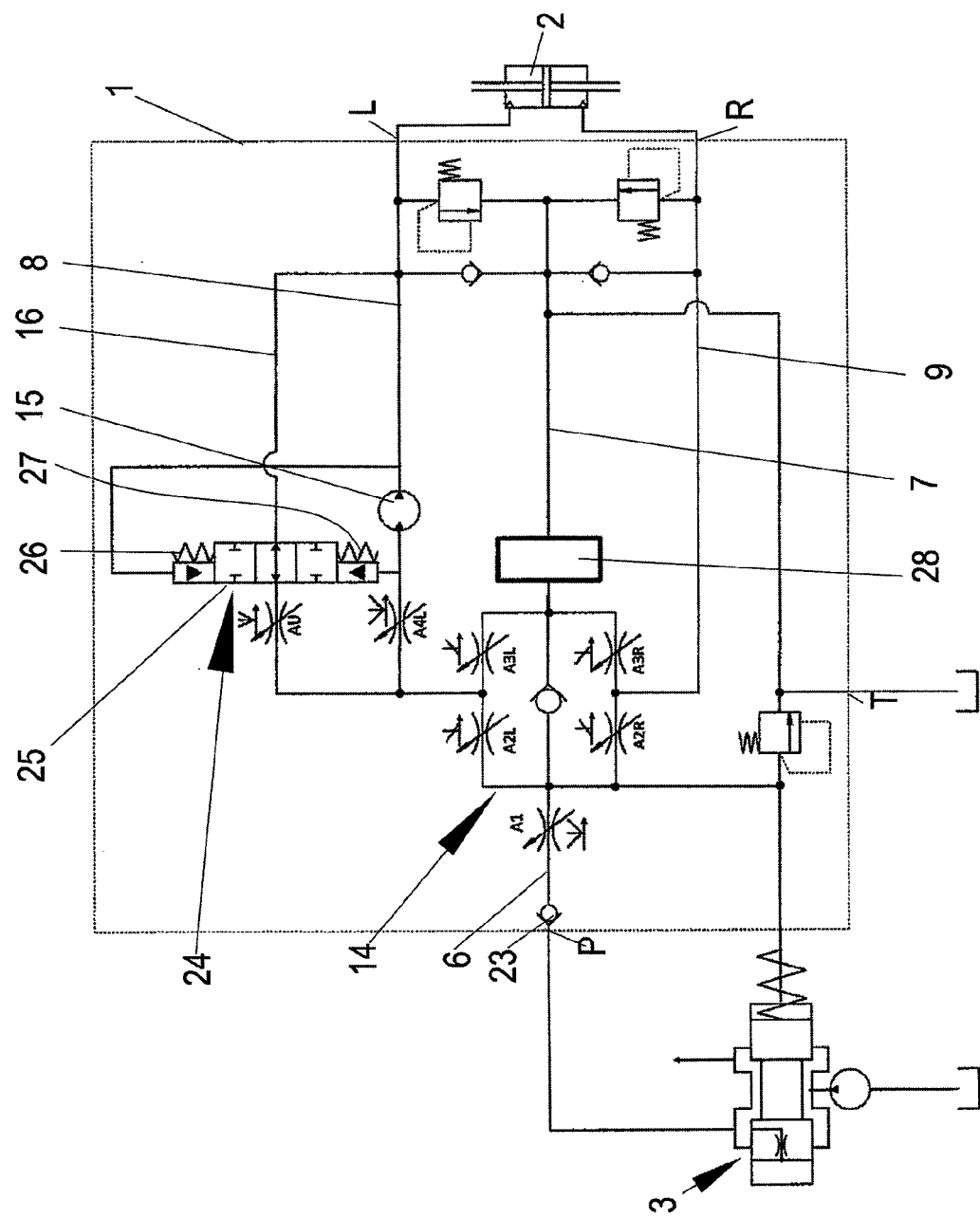
FIG. 4 shows a fourth embodiment of the invention.
In all figures the same elements are referred to with the same reference numerals.

FIG. 4 shows a modification of the steering unit 1 of FIG. 2 having a pressure compensator 24 in the amplification flow path 16 as described in connection with the embodiment shown in FIG. 3. The valve element 25 of the pressure compensator 24 is loaded by the pressure difference over the measuring motor 15 and additionally by the forces of two springs 26, 27. The flow through the amplification flow path 16 is interrupted when a force generated by the pressure difference over the measuring motor 15 exceeds the force generated by one of the springs 26, 27.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein a measuring motor is arranged in one of the left working flow path and the right working flow path and an amplification flow path is connected to the one working flow path downstream the measuring motor.

2. The hydraulic steering unit according to claim 1, wherein the amplification flow path is connected to the main flow path and comprises a first branch having a left amplification orifice connected to the left working flow path and a second branch having a right amplification orifice connected to the right working flow path.

3. The hydraulic steering unit according to claim 2, wherein a controlled auxiliary flow path is connected between the working flow path downstream the measuring motor and the tank flow path.

4. The hydraulic steering unit according to claim 3, wherein a check valve is arranged in the amplification flow path, which check valve opens in a direction to the working port arrangement.

5. The hydraulic steering unit according to claim 3, wherein a torque compensator is arranged in the amplification flow path.

6. The hydraulic steering unit according to claim 3, wherein an auxiliary orifice is arranged in the auxiliary flow path.

7. The hydraulic steering unit according to claim 6, wherein a check valve is arranged in the amplification flow path, which check valve opens in a direction to the working port arrangement.

8. The hydraulic steering unit according to claim 6, wherein a torque compensator is arranged in the amplification flow path.

9. The hydraulic steering unit according to claim 6, wherein the auxiliary orifice is closed in neutral position.

10. The hydraulic steering unit according to claim 9, wherein a check valve is arranged in the amplification flow path, which check valve opens in a direction to the working port arrangement.

11. The hydraulic steering unit according to claim 9, wherein a torque compensator is arranged in the amplification flow path.

12. The hydraulic steering unit according to claim 2, wherein a check valve is arranged in the amplification flow path, which check valve opens in a direction to the working port arrangement.

13. The hydraulic steering unit according to claim 2, wherein a torque compensator is arranged in the amplification flow path.

14. The hydraulic steering unit according to claim 1, wherein a check valve is arranged in the amplification flow path, which check valve opens in a direction to the working port arrangement.

15. The hydraulic steering unit according to claim 14, wherein a torque compensator is arranged in the amplification flow path.

16. The hydraulic steering unit according to claim 1, wherein the amplification flow path is arranged parallel to the measuring motor.

17. The hydraulic steering unit according to claim 16, wherein the working flow path and the amplification flow path comprise an orifice arrangement determining a relation between the flow through the measuring motor and the flow through the amplification flow path.

18. The hydraulic steering unit according to claim 16, wherein a torque compensator is arranged in the amplification flow path.

19. The hydraulic steering unit according to claim 1, wherein a torque compensator is arranged in the amplification flow path.

20. The hydraulic steering unit according to claim 19, wherein the torque compensator is actuated by a pressure difference over the measuring motor.

* * * * *